US006668245B1

(12) United States Patent
Iida

(10) Patent No.: US 6,668,245 B1
(45) Date of Patent: Dec. 23, 2003

(54) METHOD OF DETERMINING RESERVING ORDER NUMBER AND FINAL ORDER NUMBER OF MERCHANDISES

(76) Inventor: Susumu Iida, 1246 Sengokuhara, Hakone-machi, Ashigarashimo-gun, Kanagawa-ken (JP)

( * ) Notice: Subject to any disclaimer, the term of this patent is extended or adjusted under 35 U.S.C. 154(b) by 0 days.

(21) Appl. No.: 09/565,988

(22) Filed: May 4, 2000

(30) Foreign Application Priority Data

Aug. 27, 1999 (JP) .......................................... 11-242118

(51) Int. Cl.[7] .............................................. G06F 17/60
(52) U.S. Cl. ........................................... 705/16; 705/28
(58) Field of Search ..................................... 705/16, 28

(56) References Cited

U.S. PATENT DOCUMENTS

| 5,168,445 | A | * | 12/1992 | Kawashima et al. ........ 364/403 |
| 5,963,919 | A | * | 10/1999 | Brinkley et al. .............. 705/28 |
| 6,026,372 | A | * | 2/2000 | Savage ......................... 705/15 |
| 6,151,582 | A | * | 11/2000 | Huang et al. .................. 705/8 |

FOREIGN PATENT DOCUMENTS

JP        4-342064        * 11/1992

* cited by examiner

Primary Examiner—Gregory A. Morse
(74) Attorney, Agent, or Firm—Lewis T. Steadman

(57) ABSTRACT

The method of determining a reserving order number and a final order number of a merchandise is performed by the steps of: computing a standard sales number D for each individual day of the week while averaging the sales performance for each individual day of the week with regard to the merchandise X which is an object for determining a reserving order number and a final order number thereof during a predetermined sampling period which are stored and updated in a memory and outputting the computed result; computing a first corrected standard sales number E for each individual day of the week based on a standard customer number correction coefficient C and the standard sales number D, for each individual day of the week; computing a second corrected standard sales number E×β based on a sales number variation coefficient β and the first corrected standard sales number E for each individual day of the week and outputting the computed result; computing a reserving order number of the merchandise X for a concerned day of the week based on the second corrected standard sales number E×β it for each individual day of the week and an out-of stock safety coefficient α and outputting the computed result; and computing a difference between the sales performance of the day two day prior to the concerned day of the week and the reserving order number of the corresponding day and subtracting or adding the difference from and to the reserving order number for the concerned day of the week which is computed and outputted in the previous step to determine a reserving order correction number and outputting the determined result, whereby a method of determining a reserving order number and a final order number of a merchandise in a retailing business can be provided in which a loss of sales opportunity due to out-of stack of respective merchandises can be decreased, as well as with regard to daily delivered merchandises and perishable foods a loss due to freshness deterioration can be reduced.

2 Claims, 3 Drawing Sheets

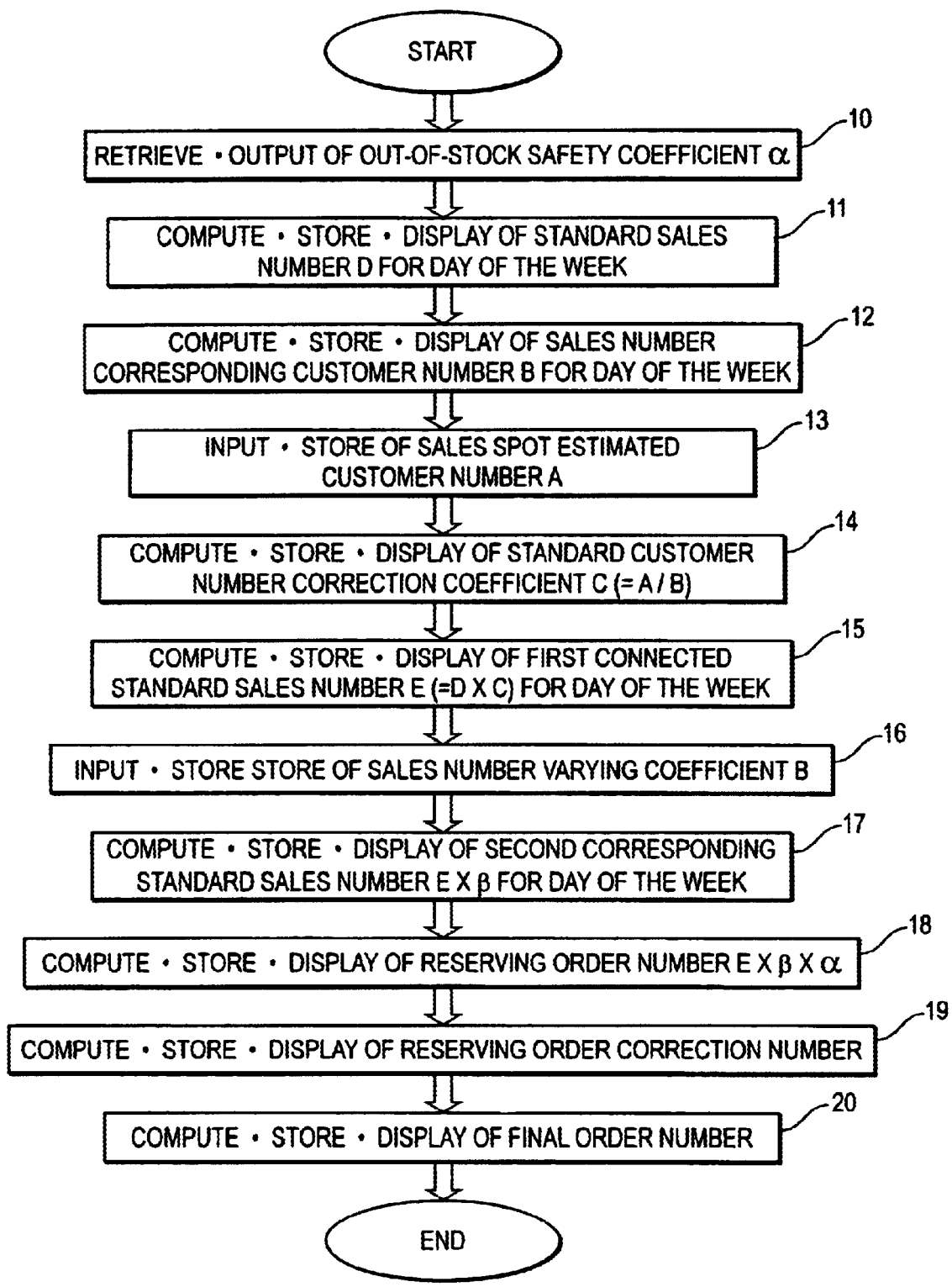

FIG. 2

| | RESERVATION CORRECTION TIME LIMIT | 09:00 | -1 | DELIVERY FREQUENCY/WEEK | 7 | | | | | | | | |
|---|---|---|---|---|---|---|---|---|---|---|---|---|---|
| VENDER | | | | | | ⇨ | ⇨ | ⇨ | ⇨ | ⇨ | ⇨ | ⇨ | ⇨ |
| MERCHANDISE | X MILK 1000ML | | | | | 12/14 | 12/15 | 12/16 | 12/17 | 12/18 | 12/19 | 12/20 | 12/21 |
| | | | | DAY OF WEEK | | MON | TUE | WED | THU | FRI | SAT | SUN | MON |
| | | | | SALES SPOT ESTIMATED CUSTOMER NUMBER A FOR DAY OF THE WEEK | | 0 | #REF! | #REF! | #REF! | #REF! | #REF! | #REF! | #REF! |
| OUT-OF-STOCK SAFETY COEFF. α | 1.15 | | | STANDARD SALES NUMBER CORRESPONDING CUSTOMER NUMBER B FOR DAY OF THE WEEK | | #REF! | #REF! | #REF! | #REF! | #REF! | #REF! | #REF! | #REF! |
| | | | | STANDARD CUSTOMER NUMBER CORRECTION A/B = C | | #REF! | #REF! | #REF! | #REF! | #REF! | #REF! | #REF! | #REF! |
| | | | | STANDARD SALES NUMBER D FOR DAY OF THE WEEK | | #REF! | #REF! | #REF! | #REF! | #REF! | #REF! | #REF! | #REF! |
| | | | | FIRST CONNECTED STANDARD SALES NUMBER D×C=E FOR DAY OF THE WEEK | | 1.18 | 1.18 | 1.18 | 1.18 | 1.18 | 1.18 | 1.18 | 1.18 |
| | | | | SALES NUMBER VARIATION COEFF. β | | #REF! | #REF! | #REF! | #REF! | #REF! | #REF! | #REF! | #REF! |
| | | | | SECOND CONNECTED STANDARD SALES NUMBER | | #REF! | #REF! | #REF! | #REF! | #REF! | #REF! | #REF! | #REF! |
| CALCULATED RESERVING ORDER NUMBER E×β×α | | | | | | | | | | | | | |

| RESERVING ORDER NUMBER | | | | | | #REF! | #REF! | #REF! | #REF! | #REF! | #REF! | #REF! | #REF! |
|---|---|---|---|---|---|---|---|---|---|---|---|---|---|
| RESERVING ORDER CORRECTION NUMBER | | | | | | #REF! | #REF! | #REF! | #REF! | #REF! | #REF! | #REF! | #REF! |
| DELIVERED NUMBER | | | | | | #REF! | #REF! | #REF! | #REF! | #REF! | #REF! | #REF! | #REF! |
| SALES NUMBER | | | | | | 646 | 634 | 735 | 688 | 836 | 1064 | 1125 | 853 |
| STOCK NUMBER | | | | | | 1 | 0 | 0 | 0 | 0 | 0 | 0 | 0 |
| | | | | | | #REF! | #REF! | | | | | | |
| | | | | | | #REF! | #REF! | | | | | | |

| SALES-RESERVING ORDER NUMBER | | | | | | #REF! | #REF! | #REF! | #REF! | #REF! | #REF! | #REF! | #REF! |
|---|---|---|---|---|---|---|---|---|---|---|---|---|---|
| NUMBER BELOW ONE CASE OF PRIOR DAY | | | | | | #REF! | #REF! | #REF! | #REF! | #REF! | #REF! | #REF! | #REF! |
| SURPLUS NUMBER IN CASE UNIT | | | | | | #REF! | #REF! | #REF! | #REF! | #REF! | #REF! | #REF! | #REF! |

FIG. 3

| VENDER | RESERVATION CORRECTION TIME LIMIT | DELIVERY FREQUENCY / WEEK | | | | | | | |
|---|---|---|---|---|---|---|---|---|---|
| MERCHANDISE X MILK 1000ML | | DAY OF WEEK | 1/25 MON | 1/26 TUE | 1/27 WED | 1/28 THU | 1/29 FRI | 1/30 SAT | 1/31 SUN | 2/1 MON |
| OUT-OF-STOCK SAFETY COEFF. α | 1.15 | SALES SPOT ESTIMATED CUSTOMER NUMBER A FOR DAY OF THE WEEK | 8696 | 6356 | 6346 | 6091 | 8156 | 7012 | 7532 | 6420 |
| | | STANDARD SALES NUMBER CORRESPONDING CUSTOMER NUMBER B FOR DAY OF THE WEEK | 8807 | 6566 | 6463 | 6127 | 8923 | 6935 | 7450 | 6737 |
| | | STANDARD CUSTOMER NUMBER CORRECTION A/B = C | 0.98 | 0.97 | 0.98 | 0.99 | 0.91 | 1.01 | 1.01 | 0.95 |
| | | STANDARD SALES NUMBER D FOR DAY OF THE WEEK | 864 | 773 | 738 | 701 | 856 | 983 | 1127 | 904 |
| | | FIRST CONNECTED STANDARD SALES NUMBER D×C = E FOR DAY OF THE WEEK | 847 | 750 | 723 | 694 | 762 | 993 | 1138 | 859 |
| | | SALES NUMBER VARIATION COEFF. β | 1.18 | 1.18 | 1.18 | 1.18 | 1.18 | 1.18 | 1.18 | 1.18 |
| | | SECOND CONNECTED STANDARD SALES NUMBER E×β FOR DAY OF THE WEEK | 999 | 885 | 853 | 819 | 899 | 1179 | 1343 | 1014 |
| CALCULATED RESERVING ORDER NUMBER | | | 1,149 | 1,018 | 981 | 942 | 1,034 | 1,356 | 1,544 | 1,168 |

| RESERVING ORDER | | | | | | | | | | |
|---|---|---|---|---|---|---|---|---|---|---|
| RESERVING ORDER CORRECTION NUMBER | | | -160 | -240 | -144 | -72 | -72 | -132 | -156 | -132 |
| DELIVERED NUMBER | | 972 | 780 | 840 | 864 | 960 | 1224 | 1392 | 1032 |
| SALES NUMBER | | 1013 | 946 | 915 | 807 | 868 | 1229 | 1218 | 875 |
| | | 1152 | 1020 | 984 | 938 | 1032 | 1356 | 1548 | 1164 |
| STOCK NUMBER | | 375 | 209 | 133 | 190 | 282 | 277 | 451 | 608 |

| SALES-RESERVING ORDER NUMBER | | | | | | | | | | |
|---|---|---|---|---|---|---|---|---|---|---|
| NUMBER BELOW ONE CASE OF PRIOR DAY | | -139 | -74 | -68 | -129 | -164 | -127 | -330 | -289 |
| SURPLUS NUMBER IN CASE UNIT | | -144 | -72 | -72 | -132 | -156 | -132 | -324 | -288 |

METHOD OF DETERMINING RESERVING ORDER NUMBER AND FINAL ORDER NUMBER OF MERCHANDISES

BACKGROUND OF THE INVENTION

1. Field of the Invention

The present invention relates to a method of determining a reserving order piece number and a final order number of merchandises, and more specifically relates to a method of determining a reserving order number and a final order number of merchandises in retailing trades for a variety of merchandises in retailing stores such as supermarkets, for example, foods such as seasonings, bottled and canned foods, confectioneries and beverages, household goods such as expendable miscellaneous goods, perishable foods such as meat, fish and side dishes and, in particular, advantageously applicable for goods called as daily delivered goods such as milk, tofu (bean curd) fermented soybeans.

2. Conventional Art

In a conventional method of ordering merchandises employed in retailing business, a future sales number is estimated according to the past sales performance, and a necessary order number is calculated so as to fulfill the sales estimation number, in that the method of ordering merchandises is primarily based on stock number of respective merchandises, for example, when :the stock of a certain merchandise reaches to a predetermined number of X, an order of a predetermined number of Y is issued or alternatively at the time of ordering, the stock is checked and the order number is determined in such a manner that the stock is always kept at a predetermined number Z, in that an order of (Z minus checked stock number) is issued at this instance. Accordingly, the stock check is always required, for this reason an error likely occurs, and in addition it is also necessary to take into account of a time interval from the ordering time to a delivery time of the goods which complexes such conventional merchandise ordering number determining method.

Moreover, with regard to merchandises of which freshness is very important such as milk, tofu and fermented soybeans, there arose further problems, for example, it is too late to determine the next order number after checking the stock at the night of very day concerned, and further, if the order number of merchandises is determined based on an automatic stock number calculation without actual check and when errors in the automatic stock number calculation increase, the such order system can not properly work.

In retail stores such as supermarkets, it was a very difficult task to accurately stock merchandises so as to meet the estimated sales number, to reduce loss of sales opportunity due to out-of stock and to minimize loss of freshness deterioration due to unsold with regard to the merchandises of which freshness quickly deteriorates generally called as daily delivered merchandises such as milk, tofu and fermented soybeans. Sales number thereof varies depending on the temperature and when it rains, the number of customers decreases and the sales number decreases accordingly. When such merchandises were unsold, freshness thereof deteriorates which leads to losses due to bargaining or disposal. If the stocking is carried out accurately, it is possible to provide for customers only fresh merchandises which increases the sales, reduces losses and improves the business operating efficiency.

The above explained points are likely applicable to perishable foods such as meat, fish and side dishes.

SUMMARY OF THE INVENTION

An object of the present invention is to provide a method of determining a reserving number and a final order number of merchandises, in particular, in retailing business which reduces difference between estimated daily sales number of merchandises concerned and the sales performance thereof, suppresses a large variation of order amount of merchandises concerned to suppliers, reduces loss of sales opportunities due to out-of stock and loss of freshness deterioration with regard to daily delivered merchandises and perishable foods as well as prevents an adverse effect to the business activities of the suppliers concerned.

According to the present invention, an estimated sales number of a merchandise concerned for each individual day of the week (hereinbelow called as standard sales number for each individual day of the week) is determined based on past sales performance for each individual day of the week, the standard sales number for each individual day of the week is corrected by making use of parameters such as a standard customer number correction coefficient, a standard sales number correction coefficient and an out-of stock safety coefficient, a reserving order of the merchandise concerned of which number is somewhat larger than the corrected standard sales number for each individual day of the week is informed to the supplier concerned, and then the difference between the reserving order number of the very day concerned and the sales performance number thereof is subtracted or added from and to the reserving order number for the next of next time to determine for the final order number for the next of next time without checking actual stock number thereof, whereby an accurate merchandise ordering can be achieved in response to always varying sales circumstances.

More specifically, the method of determining a reserving order number and a final order number of a merchandise according to the present invention is achieved by performing the following steps, in that, the step of retrieving an out-of stock safety coefficient α of a merchandise X which is an object for determining a reserving order number and a final order number thereof from an out-of stock safety map which is stored in a memory and contains respective out-of stock safety coefficients assigned for individual merchandises and classified while using as parameters a maximum sales performance number in a day and an average sales performance number in a day during a predetermined sampling period for each of the merchandises which are stored and up-dated in the memory and using as a variable a day or days from the production date of the merchandise X to the end date of best taste thereof, and outputting the retrieved out-of stock safety coefficient α; the step of computing a standard sales number D for each individual day of the week while averaging the sales performance for each individual day of the week with regard to the merchandise during the predetermined sampling period which are stored and up-dated in the memory and outputting the computed standard sales number D for each individual day of the week; the step of computing a standard customer number B for each individual day of the week corresponding to the standard sales number D for each individual day of the week while averaging customer numbers for each concerned day of the week during the predetermined sampling period which are stored and up-dated in the memory and outputting the computed standard customer number B for each individual day of the week; the step of inputting and storing an estimated future customer number A for each individual day of the week; the step of computing a standard customer number correction coefficient C based on the estimated customer number A and the standard customer number B for each individual day of the week and outputting the computed standard customer number correction coefficient C; the step of computing a first corrected standard sales number E for each individual day of the week based on the standard customer number correction coefficient C and the standard sales number D for each individual day of the week; the step of inputting and storing a sales number variation coefficient β of the merchandise X which is,the object for determining a reserving order number and a final order number thereof which primarily varies depending on strength of sales price (strength of low price impression) of the merchandise; the step of computing a second corrected standard sales number E×β based on the sales number variation coefficient β and the first corrected standard sales number E for each individual day of the week and outputting the computed second corrected standard sales number E×β; the step of computing a reserving order number of the merchandise X for a concerned day of the week based on the second corrected standard sales number E×β for each individual day of the week and the retrieved out-of stock safety coefficient a and outputting the computed reserving order number; the step of computing a difference between a sales performance of at least one day prior to the date or time at which the reserving order number for the concerned day of the week computed and outputted in the previous step can be correctable and the reserving order number of the corresponding one day and subtracting or adding the difference from and to the reserving order number for the concerned day of the week to determine a reserving order correction number and outputting the determined reserving order correction number; and the step of computing a final order number for the concerned day of the week with regard to the merchandise X by adding or subtracting the reserving order correction number for the concerned day of the week to and from the reserving order number for the concerned day of the week and outputting the computed final order number for the concerned day of the week.

BRIEF DESCRIPTION OF THE DRAWINGS

FIG. 1 is a flow chart for explaining a sequence for performing one embodiment of the method of determining a reserving order number and final order number of a merchandise in a retailing business according to the present invention;

FIG. 2 is a data sheet showing a result when the method of the one embodiment according to the present invention is applied for determining the reserving order number and the final order number for packed milks representing one of daily delivered merchandises during eight days; and FIG. 3 is an example of the sheet of FIG. 2 incorporating illustrative data.

DESCRIPTION OF A PREFERRED EMBODIMENT

The flow chart of FIG. 1 shows an embodiment of a method of determining a reserving order number and a final order number of a daily delivered merchandise which is an object for determining the reserving order number and the final order number thereof, for example, packed milks.

At first, in step 10, an out-of stock safety coefficient a of a packed milk is retrieved which is an object merchandise for determining a reserving order number and a final order number thereof, from an out-of stock safety map which is stored in a memory provided such as in a personal computer, and contains respective out-of stock safety coefficients assigned for individual merchandises and classified while using two variables, one obtained by dividing a maximum sales performance number in a day with regard to the packed milk in the latest 13 weeks excluding abnormal values with an average sales performance number in a day in the same period of which base data are stored in the memory in the personal computer and another variable represented by the number of days from the production date of the merchandise to the end date of best taste.

Further, upper and lower two out-of stock safety coefficients, for example 1.19 and 1.15, can be determined for respective merchandise, and one of the upper and lower out-of stock safety coefficients can selectively be, used in view of stock tendencies for the respective merchandises.

In step 11, a standard sales number D for each individual day of the week is determined by averaging sales performance numbers for each individual day of the week in the latest 13 weeks representing a sampling period while excluding abnormal values contained therein.

Subsequently, in step 12, a customer number B corresponding to sales number for each individual day of the week is determined which represents an average of customer numbers which corresponds to the sales performance numbers excluding abnormal values used for determining the above standard sales number D for each individual day, of the week and also stored in the memory.

In step 13, a possible customer number visiting the store concerned for each individual day of the week in near future is estimated at sales spots as an estimated customer number A for each individual day of the week and is inputted in the personal computer while estimating at the respective sales, spots, for example, a possible customer increase because of a national holiday other than saturday and sunday, a possible customer increase because of regular closure day of a competing stores a possible customer increase in the next day after regular closure of the store concerned or a possible temporary customer decrease because of an newly opening of a competing store.

In step 14, a standard customer correction coefficient C for each individual day of the week is determined based on a value obtained by dividing the previously determined sales spots estimated customer number A for each individual day of the week with the standard sales number corresponding customer number B for each individual day of the week.

Subsequently, in step 15, a first corrected standard sales number E for each individual day of the week, which includes the above explained estimation of the possible customer number variation, is determined by multiplying the previously determined standard customer correction coefficient C by the standard sales number D for each individual of the week determined in step 11.

In step 16, a sales number variation coefficient β, which reflects a sales number varying depending on a selling price of the merchandise concerned, is decided and inputted depending on the current selling price. Namely, a tendency that when the selling price is lowered, the sales number increases is indexed. For example, when assuming a case that when the selling price of a merchandise is at 89 yen, 80 pieces of the merchandise were sold in a day, but when the selling price is lowered to 79 yen, 100 pieces thereof were sold, the present sales number variation coefficient β is introduced to adjust the above difference of 20 pieces.

Further, when determining the sales number variation coefficient β, a possible sales number increase because of a bargain sale and a special event in the concerned local area such as an athletic meet and a cherry blossom viewing can be taken into account.

Subsequently, in step 17, a second corrected standard sales number E×β for each individual day of the week reflecting the selling price change is determined by multiplying the sale number variation coefficient β inputted and stored previously in step 16 by: the first corrected standard sales number E for each individual day of the week determined in step 15.

In step 18, a reserving order number for each individual day of the week is computed and displayed by multiplying the second corrected standard sales number E×β determined in step 17 by the out-of stock safety coefficient α retrieved in step 10.

In step 19, a deviation between the reserving order, number for the day two days prior to the concerned day of the week and the sales performance number for the vary day is determined as a reserving order correction number for the concerned day of the week, and the final ordering number is decided by subtraction or adding the determined reserving order correction number for the concerned day of the week from or to the previously determined reserving order number. Namely, an available latest deviation between a reserving order number and the corresponding sales performance number is reflected on a reserving order number for a subsequent future day regardless to the day of the week to determine a final order number.

Finally, in step 20, a final order number for the concerned day of the week with regard to the packed milk is computed and determined by adding or subtracting the reserving order correction number for the concerned day of the week determined in step 19 to or from the reserving order number for the concerned day of the week determined in the previous step 18.

FIG. 2 shows a resultant data sheet, when the method of the present invention as has been explained above is applied for determining a reserving order and a final order with regard to X packed milk for two weeks. From the variation of the stock number in the resultant data sheet, it is observed that the stock number converges to an optimum value.

Further, since the object merchandise, in that X packed milk is traded in a case unit, the number representing sales performance of two prior day minus reserving order number of the same day in the data sheet is not necessarily meet with the reserving order correction number of the concerned day of the week.

In the above explained embodiment, the sampling period of 13 weeks is used, however, the sampling period is not limited thereto.

Further, in the present invention, one day in each individual day of the week is used as a unit for determining an order amount, however, with regard to perishable foods such as meat, fish and side dishes a combination of a day of the week and a time range or a time range itself can be used as a unit for determining an order amount.

Still further, the method of the present invention can also be practiced by assuming a few days, one week or one month as a unit time depending a cycle from ordering to delivering of a merchandise.

According to the present invention, the loss of sales opportunity due to out-of stack of respective merchandises can be decreased, as well as with regard to daily delivered merchandises and perishable foods the loss due to freshness deterioration can be reduced, further for the customers fresh merchandises can always be supplied as well as for the suppliers orders of which order number variation is suppressed can be realized.

What is claimed is:

1. A method of determining a reserving order number and a final order number of a merchandise comprising the steps of:

retrieving an out-of stock safety coefficient α of a merchandise X which is an object for determining a reserving order number and a final order number thereof from an out-of stock safety map which is stored in a memory and contains respective out-of stock safety coefficients assigned for individual merchandises and classified according to a first variable determined by a ratio between a maximum sales performance number in a day and an average sales performance number in a day during a predetermined sampling period for each of the merchandises which are stored and up-dated in the memory and according to a second a variable determined by day or days from the production date of the merchandise X to the end date of best taste thereof, and outputting the retrieved out-of stock safety coefficient α;

computing a standard sales number D for each individual day of the week while averaging the sales performance for each individual day of the week with regard to the merchandise X during the predetermined sampling period which are stored and up-dated in the memory and outputting the computed standard sales number D for each individual day of the week;

computing a standard customer number visiting a store concerned B for each individual day of the week corresponding to the standard sales number D for each individual day of the week while averaging customer numbers visiting the store concerned for each concerned day of the week during the predetermined sampling period which are stored and up-dated in the memory and outputting the computed standard customer number visiting the store concerned B for each individual day of the week;

inputting and storing an estimated future customer number visiting the store concerned A for each individual day of the week;

computing a standard customer number visiting the store concerned correction coefficient C based on the estimated customer number visiting the store concerned A and the standard customer number visiting the store concerned B for each individual day of the week and outputting the computed standard customer number visiting the store concerned correction coefficient C;

computing a first corrected standard sales number E for each individual day of the week based on the standard customer number visiting the store concerned correction coefficient C and the standard sales number D for each individual day of the week;

inputting and storing a sales number variation coefficient β of the merchandise X which is the object for determining a reserving order number and a final order number thereof which primarily varies depending on strength of sales price of the merchandise X;

computing a second corrected standard sales number E×β based on the sales number variation coefficient β and the first corrected standard sales number E for each individual day of the week and outputting the computed second corrected standard sales number E×β;

computing a reserving order number of the merchandise X for a concerned day of the week based on the second corrected standard sales number E×β for each individual day of the week and the retrieved out-of stock safety coefficient a and outputting the computed reserving order number;

computing a difference between a sales performance of at least one day prior to the date or time at which the reserving order number for the concerned day of the week computed and outputted in the previous step can be correctable and the reserving order number of the corresponding one day and subtracting or adding the difference from and to the reserving order number for the concerned day of the week to determine a reserving order correction number and outputting the determined reserving order correction number; and computing a final order number for the concerned day of the week with regard to the merchandise X by adding or subtracting the reserving order correction number for the concerned day of the week to and from the reserving order number for the concerned day of the week and outputting the computed final order number for the concerned day of the week.

2. A method of determining a reserving order number and a final order number of a merchandise according to claim 1, wherein the at least one day prior to the date or time at which the reserving order number for the concerned day of the week can be correctable is date two day prior to the concerned day of the week.

* * * * *